United States Patent [19]

Lightbody et al.

[11] Patent Number: 5,864,000
[45] Date of Patent: Jan. 26, 1999

[54] PHENOLIC RESINS

[75] Inventors: Alan William Lightbody; John Edwar Jones, both of Dinas Powys; Murray Roy Orpin, Dyffryn, all of United Kingdom

[73] Assignee: Blagden Chemicals Limited, Vale of Glamorgan, United Kingdom

[21] Appl. No.: 934,106

[22] Filed: Sep. 19, 1997

Related U.S. Application Data

[63] Continuation of Ser. No. 754,251, Nov. 20, 1996, abandoned.

[30] Foreign Application Priority Data

Nov. 29, 1995 [GB] United Kingdom .................... 9524361

[51] Int. Cl.$^6$ ............................ C08G 77/04; C08G 77/06
[52] U.S. Cl. ............................ 528/29; 556/433; 556/432; 524/837
[58] Field of Search .............................. 528/29; 556/433, 556/432; 524/837

[56] References Cited

U.S. PATENT DOCUMENTS

| | | | |
|---|---|---|---|
| 2,755,269 | 7/1956 | Moorhead | 528/29 |
| 3,839,236 | 10/1974 | Foley et al. | 260/25 |
| 3,911,045 | 10/1975 | Hartmann et al. | 260/826 |
| 4,022,753 | 5/1977 | Lohse et al. | 260/46.5 R |
| 4,032,511 | 6/1977 | Blount | 528/29 |

FOREIGN PATENT DOCUMENTS

| | | |
|---|---|---|
| A-03149212 | 6/1991 | Japan . |
| A-041898111 | 7/1992 | Japan . |
| 05247159 | 9/1993 | Japan . |
| A-0613079 | 5/1994 | Japan . |
| 657-855 | 4/1979 | U.S.S.R. . |
| WO 96/33238 | 10/1996 | WIPO . |

*Primary Examiner*—Margaret W. Glass
*Attorney, Agent, or Firm*—Nixon & Vanderhye P.C.

[57] ABSTRACT

This invention relates to a hybrid phenolic/polysiloxane resin derivable by (A) reacting a phenolic compound with (a) a siloxane polymer or (b) an aldehyde and (B) reacting the reaction product of stage (A)(a) with an aldehyde, or, (A)(b) with a siloxane polymer to form the hybrid phenolic/polysiloxane resin, said resin having a siloxane content of 1–40% by weight of the total hybrid resin and a viscosity in the range of 100–10000 mPa s. The products derived from the hybrid resins of the present invention have enhanced impact strength; can tolerate higher burst pressures in pipe applications, have improved resistance to hydrolysis and other environmental weathering characteristics; have improved fire stability; and show improved film flexibility in coatings.

21 Claims, No Drawings

PHENOLIC RESINS

This is a continuation of application Ser. No. 08/754,251, filed Nov. 20 1996, now abandoned.

This invention relates to a hybrid phenolic resin derivable from the initial reaction of two of the three components that are a phenol, a siloxane and an aldehyde, and then adding the third component to the initial reaction mixture and to a process for the synthesis thereof.

It is well known to produce phenolic resins from a phenolic compound and an aldehyde such as formaldehyde. Such phenolic resins find wide uses such as eg in the making of thermosetting resins, thixotropic compositions, foams, laminates, pipes, ducts, adhesives and coatings.

It has now been found that the physical and fire resistant properties of such phenolic resins can be improved significantly, if siloxanes are incorporated therein during their production in order to form hybrid resins.

Accordingly, the present invention is a hybrid phenolic/polysiloxane resin derivable by
A. reacting a phenolic compound with
  a. a siloxane polymer or
  b. an aldehyde and
B. reacting the reaction product of stage
  (A)(a) with an aldehyde, or,
  (A)(b) with a siloxane polymer to form the hybrid phenolic/polysiloxane resin, said resin having a siloxane content of 1–40% by weight of the total hybrid resin and a viscosity in the range of 100–10000 mPa s.

The hybrid phenolic/polysiloxane resin (hereafter termed "hybrid resin" for convenience) suitably has the following physical characteristics all by weight of the total hybrid resin:
  i. a siloxane content of 1–40%;
  ii. a water content of <15%;
  iii. a free aldehyde content of <5%; and
  iv. a free phenolic compound content of <15%.

By the expression "phenolic compound" as used herein and throughout the specification is meant a compound having phenolic hydroxyl groups. Thus, phenolic compounds used to form the hybrid resin may be one or more of phenol, the isomeric cresols, nonyl phenol, styrenated phenols, bromo-phenols, catechol, resorcinol, the isomeric xylenols and phenolic resins (derived from a phenolic compound and an aldehyde) having a molecular weight below 1000 preferably from 200 to 500. Of these, phenol itself and the isomeric cresols are preferred.

By the expression "siloxane polymer" is meant here and throughout the specification compounds having a —Si—O—Si— grouping in their structure. Thus, the siloxane polymer used to form the hybrid resin is suitably alkoxy and/or silanol functional siloxane polymer having a molecular weight ranging from 1000 to 6000. Of these, siloxane polymer marketed by Wacker Chemie under the trade name SY-231 (which is a siloxane with alternating phenyl and methoxy group on its backbone in which the phenyl to methoxy group ratios is at least 1.4 per molecule and which has a molecular weight of about 1000) or the equivalent product, 3074 from Dow Corning, is preferred.

The aldehydes that may be used for making the hybrid resins of the present invention suitably comprise one or more of aliphatic aldehydes such as formaldehyde, acetaldehyde, propionaldehyde and butyraldehyde or aqueous solutions thereof and is preferably formaldehyde which can be used as an aqueous solution thereof, ie formalin.

The two methods of forming the hybrid resin outline above are described below in some detail and each method has been sectionalised for clarity.

1. Method A(a)+B(A)(a)
1.1 Stare A(a): Reacting the phenolic compound with a siloxane polymer In this method, the phenolic compound is initially reacted with a siloxane polymer in the presence of a catalyst.

The amount of the siloxane polymer used in relation to the phenolic compound is suitably in the range by weight from 7:50 to 10:20, preferably about 7:30. For this reaction the catalyst may be alkaline, amphoteric or acidic, but is preferably alkaline. Examples of catalysts that may be used include inter alia an alkali metal hydroxide or an alkaline earth metal hydroxide. More specifically, the catalyst is preferably sodium hydroxide. The amount of catalyst used for this reaction is suitably below 10 parts by weight, preferably from 2 to 10, parts for every 100 parts of the phenolic compound used as the reactant. The catalyst may be used in conjunction with a co-catalyst. Examples of co-catalysts that may be used include organo tin compounds, especially alkyl tin dicarboxylates wherein the alkyl group may contain 1–4 carbon atoms, and specifically dibutyl tin diacetate. Where a co-catalyst is used, it is suitably present in an amount from 0.1–4 parts for every 100 parts of the phenolic compound used as the reactant.

The reaction between the phenolic compound and the siloxane polymer is suitably carried out at a temperature in the range from 30° to 80° C., preferably from 40° to 50° C. such as eg 40° C. The reaction is suitably carried out for a relatively short time ranging from 5 minutes to about 3 hours, preferably from about 20 minutes to about 2 hours, eg 30 minutes.

The products from this stage A(a) of the method may comprise further polymerisation products since the siloxane polymers used as reactants have a tendency to polymerise in the presence of the catalysts of the type now used for this reaction. Where such polymerisation occurs, it is important that the molecular weight of such a polymer is controlled so that it is within the range from 1000–5000, preferably from 1000–3000 in order to prevent the siloxane polymers precipitating out as a separate phase in the reaction products.

1.2 Stage B(A)(a): Reaction of Product A(a) with an Aldehyde

The products from stage A(a) of the method are then reacted with an aldehyde in a stage B. The relative proportions of the reaction products from stage A(a) and the aldehyde for the condensation reaction in stage B is suitably in the range by weight from 1:2 to 2:1.

The stage B condensation reaction is suitably carried out in the presence of a catalyst which is preferably alkaline and may be the same as that used in stage A(a). In fact, if the reaction products from stage A(a) are used directly without being subjected to any separation stages, the catalyst present in stage A(a) products may be sufficient to effect condensation with the aldehyde in stage B.

The stage B(A)(a) condensation reaction with the aldehyde is suitably carried out a temperature in the range from 40° to 85° C., preferably from 60° to 80° C. The duration of this stage B reaction is suitably from 30 minutes to 3 hours, preferably from 45 minutes to 2 hours.

The products of this reaction are the desired hybrid resins. Neutralisation (to about pH 6) is carried out at a water content from 5–8% and then distillation is continued to a typical final water content of 2–3%.

2. Method A(b)+B(A)(b)
2.1 Stage A(b): Reacting the phenolic compound with an aldehyde The products made by Method 1 above may also be made by reacting a phenolic compound initially with an aldehyde in the presence of a catalyst. For this stage A(b), the relative mole ratios of the aldehyde to phenolic compound used in this stage is suitably in the range from 1.1:1 to 2.5:1.

For this reaction A(b), the catalyst, as previously, may be alkaline, amphoteric or acidic, but is preferably alkaline. Examples of catalysts that may be used include inter alia an alkali metal hydroxide or an alkaline earth metal hydroxide. More specifically, the catalyst is preferably sodium hydroxide. The amount of catalyst used for this reaction is suitably in the range from 2 to 10 parts for every 100 parts of the phenolic compound used as the reactant. The catalyst may be used in conjunction with a co-catalyst. Examples of co-catalysts that may be used include organo tin compounds, especially alkyl tin dicarboxylates wherein the alkyl group may contain 1–4 carbon atoms, and specifically dibutyl tin diacetate. Where a co-catalyst is used, it is suitably present in an amount from 0.1–4 parts for every 100 parts of the phenolic compound used as the reactant.

Stage A(b) of the reaction between the phenolic compound and the aldehyde is suitably carried out at a temperature in the range from 30° to 70° C., preferably from 40° to 50° C. such as eg 50° C. The reaction is suitably carried out for a time ranging from 30 minutes to about 3 hours, preferably from about 60 minutes to about 2 hours, eg 60 minutes.

The products from stage A(b) carried out using the phenolic compound and the aldehyde will comprise of mono-, di- and tri- additions of the aldehyde to the phenolic ring, since such by-products have a tendency to be produced in the presence of the catalysts of the type now used for this reaction. Where such additions occur, it is important that the molecular weight of the product is controlled so that it is within the range from 150–8000.

2.2 Stage B(A)(b): Reaction of Product A(b) with a siloxane polymer

The reaction product from this stage A(b) is used for reaction with the siloxane polymer in stage B(A)(b). However, with this type of resin, the pH is kept high at a value from pH 8–9 during distillation in order to promote co-condensation.

The relative proportions of the reaction products from stage A(b) and the siloxane polymer in stage B(A)(b) is suitably in the range by weight from 20:1 to 2:1.

The stage B(A)(b) reaction is suitably carried out in the presence of a catalyst which is preferably alkaline and may be the same as that used in stage A(b). In fact, if the reaction products from stage A(b) are used directly without being subjected to any separation stages, the catalyst present in stage A(b) products may be sufficient for the stage B(A)(b) reaction.

The stage B(A)(b) reaction is suitably carried out at a temperature in the range from 35° to 85° C., preferably from 60° to 80° C. The duration of this stage B(A)(a) reaction is suitably from 20 minutes to 3 hours, preferably from 45 minutes to 2 hours.

Whether the hybrid resins are produced by Method 1 or Method 2, the reaction between the stage A reaction products, and either the aldehyde or siloxane polymer in stage B may be carried out in the presence of a silane in order to facilitate and promote interaction between the organic and inorganic phases which may separate during the course of the reaction. By a "silane" is meant here and throughout the specification a compound of the formula:

$$R_xSi(OR')_{4-x}$$

wherein R is an alkyl group and/or a functional amino group so that at least one of its R groups is a functional amino or epoxy group, R' is H, a $C_1$–$C_4$ alkyl group or combinations thereof and x has a value from 1 to 3. Thus, the OR' groups in the silane may be fully or partially hydrolysed, ie they may all be OH groups or all be O-Alkyl groups or any combinations thereof Those silanes having at least some free OH groups are preferred. A specific example of such a silane is n-(2-aminoethyl)-3-aminopropyltrihydroxy silane which can be represented by the formula: $NH_2CH_2CH_2NH(CH_2)_3Si(OH)_3$.

This reaction and the subsequent working up of the stage B reaction products from both Methods 1 and 2 is very similar in all other respects to the conventional production of a phenolic resole resin from a phenolic compound and an aldehyde.

In the process of the present invention, it is preferable to add a small amount of one or more of the following compounds prior to distillation of the stage B reaction products to reduce the water content thereof to below 15%:

i. an acid to neutralise the alkaline catalyst, when used;
ii. a surfactant such as an alkoxylated castor oil eg ethoxylate castor oil, to stabilise the resin/resole formed; and
iii. a glycol such as eg monoethylene glycol.

It is preferable to reduce this water content to below 2%. The hybrid resin product after vacuum distillation is also relatively low in free aldehyde content (usually <5% by weight, preferably <3% by weight) and free phenol content (<15% by weight, preferably <10% by weight).

The hybrid resins are very sensitive to the presence of acids which initiate rapid curing of the resin. Therefore, whilst storing the hybrid resins care should be taken to avoid contact with any acidic materials although such resins can be formulated with any other desired ingredients prior to storage. The hybrid resins, due to their relatively low water content, are stable and have reasonably long pot lives.

The resultant hybrid resins can be used in many of the applications including the making of thermosetting resins, thixotropic compositions, foams, laminates, composites, pipes, ducts, linings, adhesives and coatings. In using these hybrid resins to make any of the aforementioned products, it would be necessary to use an acidic curing agent (also known as a hardener). The curing agent is suitably selected from one or more of mineral acids, organic acids or a compound capable of giving rise to said acids under the curing conditions eg by hydrolysis. Specific examples of mineral acids are hydrochloric acid, sulphuric acid, and phosphoric acid and partial esters thereof Specific examples of organic acids are the sulphonic acids, especially the xylene sulphonic acids and toluene sulphonic acids, particularly para-toluene sulphonic acid. An example of a compound capable of giving rise to the acid curing agent under the curing conditions is an acyl halide. It is preferable to use a combination of two or more of these such as eg a combination of a mineral acid and an organic acid. A particularly preferred combination is that of a sulphonic acid and phosphoric acid. An example of such a curing agent is Phencat ®381 (ex C F Budenheim) comprising a partial phosphate ester (derived by reacting polyphosphoric acid with a diol or a polyol) and 5% by weight of para-toluene sulphonic acid. Use of such partial phosphate esters as hardeners for phenolic resins is claimed and described in our prior published EP-A-0539098.

The amount of the acidic curing agent used is suitably in the range from 5– 15% by weight of the hybrid resin employed.

The products made from the hybrid resins of the present invention can be subjected to elevated temperature during and/or after curing. A feature of the hybrid resins of the present invention is that products such as composites formed therefrom show improved performance after such high temperature treatment.

The products derived from the hybrid resins of the present invention have enhanced impact strength, can tolerate higher burst pressures in pipe applications; have improved resistance to hydrolysis and other environmental weathering characteristics; have improved fire stability; and show improved film flexibility in coatings. These characteristics are a particular improvement over those exhibited by epoxy resins conventionally used in such applications. Furthermore, such resins can be produced more economically than epoxy resins.

The present invention is further illustrated with reference to the following Examples:

EXAMPLE 1

The following ingredients were used:

| CHARGE | PARTS | MASS (g) |
| --- | --- | --- |
| Phenol | 100 | 2000 |
| Formalin (44% solution) | 116.5 | 2330 |
| Siloxane SY 231 | 15 | 530 |
| 25% Caustic soda soln. | 4.2 | 84 |
| Monoethylene glycol | 7* | 227 |
| p-TSA (65% solution) | — | (92 ml) |
| Silane 1-6137 (ex Dow) | 1* | 35 |

*- amount based on the final mass.

Phenol, siloxane SY231 and caustic soda were charged into a reactor and initially heated to 40° C. and blended for 45 minutes. To this mixture was charged formalin and further heated to 60° C. for 0.5 hrs. The heating was continued further to raise the temperature to 80° C. until the desired viscosity (21.8 mm$^2$/s) was obtained. The reaction mixture was then neutralised with p-toluene sulphonic acid (p-TSA) until the pH was 7.5 followed by addition of monoethylene glycol. The resultant mixture was subjected to vacuum distillation to produce a hybrid resin. The viscosity of this hybrid resin was adjusted by addition of water to 4200 mPa s (cPs). The hybrid resin so formed had a water content of 3.0%, a free phenol content of 9.9% and a free formaldehyde content of 2.0%. The silane was added to the hybrid resin.

EXAMPLE 2

The following reactants were used in this Example.

| CHARGE | PARTS | MASS (g) |
| --- | --- | --- |
| Phenol | 100 | 2000 |
| Formalin (44% solution) | 116.5 | 2330 |
| Siloxane SY 231 | 11.8 | 530 |
| 25% Caustic soda soln. | 4.2 | 84 |
| Monoethylene glycol | 5 | 227 |
| p-TSA (65% solution) | — | (90 ml) |
| Silane 1-6137 (ex Dow) | 1.18* | 53 |

*- amount based on the siloxane used.

Phenol, formalin and caustic soda solution were blended in a reactor at 40° C. for 0.5 hour and then the temperature was raised to 60° C. and maintained at that temperature for a further 0.5 hour to form an intermediate phenol-formaldehyde resin.

To 100 parts of this intermediate resin (4500 g) was added the siloxane and silane and the resultant mixture was blended in a reactor at 35° C. for 0.5 hour. The alkali in the reaction mixture was then neutralised with p-TSA and the monoethylene glycol was then added. The resultant product was then subjected to vacuum distillation. The hybrid resin so formed had a viscosity of 3160 mPa s (cPs), a water content of 8%, a free phenol content of 8.9% and a free formaldehyde content of 1.2%.

EXAMPLE 3

The following reactants were used in this Example.

| CHARGE | PARTS | MASS (g) |
| --- | --- | --- |
| Phenol | 100 | 2000 |
| Formalin (44% solution) | 116.5 | 2330 |
| Siloxane SY 231 | 15 | 530 |
| 25% Caustic soda soln. | 4.2 | 84 |
| Monoethylene glycol | 7* | 227 |
| p-TSA (65% solution) | — | (90 ml) |
| Silane 1-6137 (ex Dow) | 1 | 20 |
| Metatincat ® 702** | 0.2 | 4 |

*- amount based on the final mass.
**- a dibutyl tin diacetate (ex ACIMA)

Phenol and the siloxane were blended and solubilized in a reactor by heating to 40° C. The Metatincat® 702 catalyst was then added and stirred for about 30 minutes. Thereafter the formalin and caustic soda were charged to the reactor and the temperature raised to 60° C. and maintained at this temperature for 30 minutes. The temperature was then raised to 80° C. and maintained at that temperature until the viscosity of the mixture was 21.4 mm$^2$/s (cSt). The resultant product was then neutralised with p-TSA until the pH was 7.3 and monoethylene glycol then added. This mixture was then subjected to vacuum distillation to reduce the water content thereof. Thereafter the silane was added. The hybrid resin so formed had a viscosity of 1700 mPa s (cPs), a water content of 4.4%, a free phenol content of 8.9% and a free formaldehyde content of 1.5%.

EXAMPLE 4

The following reactants were used in this Example.

| CHARGE | PARTS | MASS (g) |
| --- | --- | --- |
| Phenolic resin* | 100 | 4500 |
| Siloxane SY 231 | 15 | 530 |
| Monoethylene glycol | 6** | 233 |
| 25% Caustic soda soln. | — | (15 ml) |
| Metatincat ® 702 | 0.2 | 4 |
| p-TSA (75% solution) | — | (88 ml) |

*- The resin used was the intermediate produced in the initial stage of Example 2 above.
**- amount based on the final mass.

The intermediate phenolic resin was initially neutralised with p-TSA in a reactor until the pH thereof was 7.6 and then blended with the siloxane at 35° C. for 20 minutes. Thereafter, the Metatincat® 702 catalyst was added thereto and then monoethylene glycol was added. The tin catalyst was then neutralised with a further aliquot of the caustic soda solution to bring the pH value to 8.0. The resultant mixture was subjected to vacuum distillation to reduce the water content thereof. The final hybrid resin so formed had a viscosity of 3220 mPa s (cPs), a water content of 4.7%, a free formaldehyde content of 1.55% and a free phenol content of 8.4%.

EXAMPLE 5

The following ingredients were used:

| CHARGE | PARTS | MASS (kg) |
|---|---|---|
| Phenol | 100 | 1310 |
| Formalin (44% solution) | 116.5 | 1526 |
| Siloxane SY 231 | 17.2 | 225 |
| 25% Caustic soda soln. | 4.2 | 55 |
| p-TSA (65% solution) | 6.4 | 84 |

Phenol, formalin and caustic soda were charged into a reactor and initially heated to 60° C. and blended for 30 minutes until the viscosity at 25° C. was 13–15 mm$^2$/s (cSt). To this cooled mixture was charged the siloxane and the resultant mixture was subjected to vacuum distillation to produce a hybrid resin having water content of 5–10%. The reaction mixture was then neutralised with p-toluene sulphonic acid (p-TSA) until the pH was 5.5–6.2. The resultant mixture was subjected to further vacuum distillation at 94.81 kPa (28 inches Hg) and 80° C. to reduce the water content thereof to <2.5%. The viscosity of this hybrid resin was 1800–2800 mPa s (cPs) at 25° C.

The physical characteristics of the above hybrid resin are tabulated below in Table 6 and is compared with the properties of conventional resins. In the data provided, the reference to 10% Siloxane relates to the amount of Siloxane in the final product, in the case of Example 5 after removal of water by vacuum distillation.

TABLE 6

| Resin Type | Hoop Stress (MPa) | Impact Resistance (kPa) | Burst Pressure (MPa) | Thickness (mm) |
|---|---|---|---|---|
| Base Resin (no Siloxane) | 165.5 | 69 | 20.7 | 4.01 |
| Blend of Base Resin + 10% Siloxane* | 219.2 | 69 | 30.3 | 4.01 |
| Hybrid Resin containing 10% Siloxane (Ex 5) | 247.5 | 172 | 31 | 3.50 |

*- This is a comparative test (not according to the invention) in which the initial phenol-aldehyde resin of Example 5 (base resin) was mixed with 10% siloxane and a catalyst but without heating the resultant mixture of reducing the water content thereof.

We claim:

1. A hybrid phenolic/polysiloxane resin composition having a siloxane content of 1 to 40% by weight and a viscosity in the range of 100 to 10000 mPa s at 25° C., wherein said resin is acid curable and is derived by the steps of:
   (A) reacting a phenolic compound having a molecular weight of less than 1000 with
      (a) an alkoxy or silanol functional siloxane polymer or
      (b) an aldehyde
   and
   (B) reacting the reaction product of step
      (a) with an aldehyde, or
      (b) with an alkoxy or silanol functional siloxane polymer.

2. A hybrid resin composition according to claim 1 wherein said siloxane content is 5–40% by weight of the total hybrid resin.

3. A hybrid resin composition according to claim 1 said resin having the following physical characteristics all by weight of the total hybrid resin:

a. a water content of <15%;
   b. a free aldehyde content of <5%;
   c. a free phenolic compound content of <15%.

4. A method for producing a hybrid resin composition according to claim 1, said method comprising the steps of
   (A) reacting said phenolic compound in the presence of a catalyst with
      (a) said siloxane polymer, or with
      (b) said aldehyde and
   (B) condensing in the presence of a catalyst the reaction product of step (A)(a) with an aldehyde, or of step (A)(b) with said siloxane polymer.

5. A method according to claim 3 wherein the phenolic compound used to form the hybrid resin is one or more compounds selected from the group of phenol, the isomeric cresols, nonyl phenol, styrenated phenols, bromo-phenols, catechol, resorcinol, the isomeric xylenols and phenolic resins derived from a phenolic compound and an aldehyde having a molecular weight below 1000 preferably from 200 to 500.

6. A method according to claim 3 wherein the aldehyde used to form the hybrid resin is one or more aldehydes selected from the group formaldehyde, acetaldehyde, propionaldehyde and butyraldehyde, and aqueous solutions thereof.

7. A method according to claim 3 wherein the siloxane polymer used to form the hybrid resin is an alkoxy and/or a silanol functional siloxane polymer having a molecular weight ranging from 1000 to 6000.

8. A method according to claim 6 wherein the siloxane polymer is a siloxane with alternating phenyl and methoxy groups on its backbone in which the phenyl to methoxy group ratio is at least 1.4 per molecule and the siloxane polymer has a molecular weight of about 1000.

9. A method according to claim 3 wherein the stages (A) and (B) of the method are carried out in the presence of a catalyst which is alkaline.

10. A method according to claim 8 wherein the catalyst is used in conjunction with a co-catalyst which is an alkyl tin dicarboxylate wherein the alkyl group contains 1–4 carbon atoms.

11. A method according to claim 8 wherein the organo tin compound is dibutyl tin diacetate.

12. A method according to claim 3 wherein stage B is carried out in the presence of a silane having a functional amino or epoxy group.

13. A method according to claim 3 wherein a small amount of one or more of the following additives is added to the product from stage B prior to distillation thereof to reduce the water content thereof to below 15%:
   a. an acid to neutralise the alkaline catalyst where used;
   b. a surfactant selected from an alkoxylated castor oil eg ethoxylate castor oil, to stabilise the resin/resole formed; or
   c. a glycol.

14. A method according to claim 3 wherein the amount of the siloxane polymer used in relation to the phenolic compound for the stage (A)(a) of the method is in the range by weight from 7:50 to 10:20.

15. A method according to claim 3 wherein stage (A)(a) of the method is carried out at a temperature in the range from 30° to 80° C.

16. A method according to claim 3 wherein the relative proportions of the reaction products from stage (A)(a) and the aldehyde for the condensation reaction in stage B(A)(a) is in the range by weight from 1:2 to 2:1.

17. A method according to claim 3 wherein stage B(A)(a) is carried out at a temperature in the range from 40° to 85° C.

18. A method according to claim 3 wherein the mole ratio of the aldehyde used in relation to the phenolic compound for the stage (A)(b) of the method is in the range from 1.1:1 to 2.5:1.

19. A method according to claim 3 wherein stage (A)(b) of the method is carried out at a temperature in the range from 30° to 70° C.

20. A method according to claim 3 wherein the relative proportions of the reaction products from stage (A)(b) and the siloxane polymer for the reaction in stage B(A)(b) is in the range by weight from 20:1 to 2:1.

21. A method according to claim 3 wherein stage B(A)(b) is carried out at a temperature in the range from 30° to 80° C.

* * * * *